9722X
W. A. Arnold.
Cooking Stove.
Patented Jun. 16, 1836.
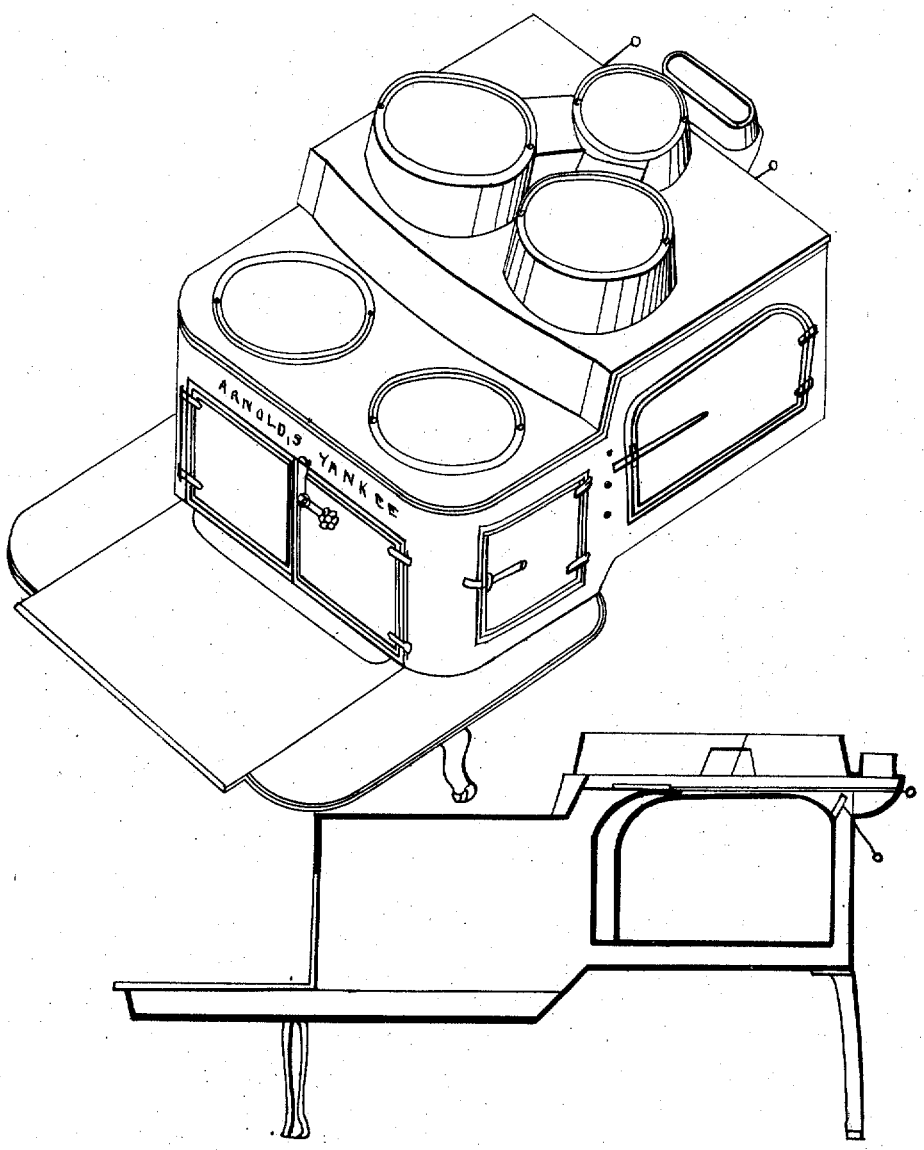

6/16/1836 9722X

Willard A Arnold of Northamton Massachusetts
Letters Patent
The Schedule referred to in these Letters Patent and making part of the
same containing a description in the words of the said Willard
A. Arnold himself of his "improvement in the Cooking Stove."

To all persons to whom these presents shall come Greeting. Be
it known that I Willard A. Arnold of Northampton in the Coun
ty of Hampshire, and Commonwealth of Massachusetts. Tin
plate worker has invented a new and useful improvement in Cook-
ing Stoves [illegible] [illegible] I have denominated Arnolds Yankee Cooking
Stove and that the following is an exact and full description of the
construction and operation of said Cooking Stove so invented im
proved and combined by me. My said invention improvement
or new combination of machinery consists of a cast iron Stove of any requi-
red dimensions standing on three or more legs. and having an el-
liptical or semi circular hearth with a sunk hearth. of two or more
inches in depth in the centre of it extending under the fire place.
Back of the [illegible] elliptical hearth and on the same level with it.
is a fire place having folding doors. in front and one in the end
of it for feeding the fire. Back of the fire place is a cast iron oven
having doors opening on each end of it. and the top of the oven
being in the form of an arch. Between the oven and the fire-
place is a plate or fender placed one inch or more in front of
the oven rising to the point where the arch of the oven is sprung
when it is made gradually to approach the oven until it
comes in contact with and sets upon the top of the oven.
In the side pieces of the Stove between this iron fender and
the oven are made three or more small perforations to admit air
for the purpose of regulating the heat of the oven. A passage for
the heat and smoke of the fire, one inch or more in depth exten-
ding the whole breadth of the Stove and raised one or more. inches
above the bottom of the bottom of the hearth of the fire place is made under the oven and up the backside of it. from whence is, an outlet throug
a lip and collar into the funnel or conductor leading into the chim-
ney. the passage on the backside of the oven being a little larger
than that under it. another passage for heat and smoke is made from
the top of the fire place and over the oven into the funnel or con-
ductor aforesaid occupying the space between the top of the oven
and the top plate of the stove back of the fire place. At the
rear and lower corner of the stove below the lip and collar is
a damper. which shuts off or admits the heat and smoke
through the passage under and up the back side of the oven.
The whole body of the stove back of the fire place is raised one or more
inches higher than the front part. That part of the sunk hearth which
is in front of the folding doors of the fire place is to be covered with
a plate sliding in grooves on each side and by which the draft of the
stove is to be regulated. The top plate or plates of the stove ex-
tend from the front of the fire place back to the lip and collar
through which the smoke is conducted into the funnel or other
outlet. There are two or more perforations in the top plate direct-
ly over the fire place for the admission of pots kettles and other
culinary utensils with rims and covers. Over the front part of the
top of the oven are two or more perforations for the same purpose
with collars. rims and covers, back of which others can be construct-
ed. if needful to be connected with those in front by square
channels for the free passage of heat and smoke from those in front
to those in the rear. The top of the stove back of the fire place
is elevated one or more inches above the top of the oven.
Should it be desirable to have more room for baking than is
contained in the cast iron oven it may be had by placing tin cyl-
inders on the top of the stove, with covers occupying the whole or
a part of the top of the stove.
Operation. By constructing a fire in the fire place the heat and
smoke will pass off through the two passages above and under
and back of the oven as before described through the lip and

6/16/1836 9722X collar into the funnel or other outlet therefor and by which the neces-
sary heat will be generated for baking boiling and all other culinar-
y purposes for which it may be required
The said Willard A Arnold claims as his own invention and
improvement in the Cooking Stove herein before described only the
particular combination of parts and machinery as herein described
and combined for that purpose. And the said Willard A.
Arnold does further solemnly declare that he is a free and Na-
tive born Citizen of the United States.
In testimony that the foregoing is a full and exact description
and Specification, of the construction and operation of my said in-
vention improvement and new combination of parts and machine-
ry for a cooking stove I have hereunto set my hand at Northamp-
ton aforesaid this ninth day of April in the year of our Lord
One thousand Eight hundred and thirty six. [illegible]

Witnesses
A. O. Saunders
Curtis Collins

Willard A. Arnold (1040 Words)

(Patented June 16. 1836)

Drawing